Aug. 25, 1959    J. E. JACOBS    2,901,633
LIGHT RESPONSIVE SYSTEM
Filed Oct. 12, 1953    2 Sheets-Sheet 1

INVENTOR:—
JOHN E. JACOBS
BY:—
Junius F. Cook, Jr.
ATTORNEY

Aug. 25, 1959      J. E. JACOBS      2,901,633
LIGHT RESPONSIVE SYSTEM
Filed Oct. 12, 1953      2 Sheets-Sheet 2

INVENTOR:—
JOHN E. JACOBS
BY:—
*Junius F. Cook, Jr.*
ATTORNEY

United States Patent Office 2,901,633
Patented Aug. 25, 1959

2,901,633

LIGHT RESPONSIVE SYSTEM

John E. Jacobs, Milwaukee, Wis., assignor to General Electric Company, a corporation of New York Application October 12, 1953, Serial No. 385,563

7 Claims. (Cl. 250—214)

The present invention relates in general to illumination, and has more particular reference to the control of light emitting lamps, especially vehicle headlight lamps, the invention pertaining specifically to an improved system operable automatically to dim the headlight lamps of a vehicle in response to the head-on approach of another headlighted vehicle.

Vehicle headlight lamps commonly comprise electrically actuated devices embodying dual filaments in combination with reflector means, the filaments being positioned with respect to the associated reflector means so as to project a so-called "high" or "bright" light beam substantially horizontally when one of the filaments is energized, a downwardly inclined so-called "dim" or "low" beam being emitted when the other of said filaments is energized. The high light beam is usually employed for normal night driving purposes, it being the practice to dim the headlights, by extinguishing the high beam and energizing the low beam filament, when approaching another vehicle traveling in the opposite direction, at night, in order to eliminate driving hazards due to the eye dazzling effect of the high beam upon the operator of the approaching vehicle.

For headlight dimming purposes it is conventional to provide a dimming switch operable, as by foot pressure of the vehicle operator, to disable the high beam filament while simultaneously energizing the low beam filament.

An important object of the present invention is to provide automatic control means operable to dim the headlights of a vehicle in response to the approach of another lighted vehicle proceeding in the opposite direction and to restore the vehicle headlights to the high beam condition immediately after the approaching vehicle shall have passed by; a further object being to provide automatic headlight control equipment of simple yet rugged character, adapted to furnish trouble-free operation during an extensive service life; a further object being to provide equipment of the character mentioned that is adapted for easy installation and interconnection with the existing headlight energizing circuits.

Another important object is to provide an improved photosensitive control system embodying a light detecting element comprising a semi-conductor element and electrical translation means controlled by the detector element and operable in response to variations in the impedance thereof to actuate a relay switch for headlight dimming purposes.

Another important object is to provide a system of the character mentioned utilizing as a sensitive light detector element a crystalline semi-conductor material from the class including cadmium sulphide, mercury sulphide, and cadmium selenide, the same comprising electron donor semi-conductors.

Another important object is to provide for the application of uni-directional electric power at relatively high potential of the order of 250 volts for the optimum operation of the detector in a vehicle mounted system energized from a relatively low voltage uni-directional power source.

Another important object is to provide a control system of the sort mentioned having means to compensate for relatively slow response characteristics of a light sensitive detector employed to control the system, whereby the system may be caused to operate within an interval of substantially less duration than the response interval of the detector; a further object, to such end, being to provide for measuring the rate of change of the response of the detector, as distinguished from gross detector response, and to actuate the control system in response to such measured rate of change.

Another important object is to operate the control system at least in part in response to the rate of change of electrical current in a light sensitive detector element, as distinguished from operation of the system in response to total current flow in the circuit.

Another important object is to provide a system, controlled by a light sensitive detector and connected to energize a relay, including means to measure the rate of change of the response of the detector, in terms of corresponding fluctuations of electrical potential, and means such as an electron flow valve controlled by such voltage fluctuations for correspondingly operating the relay; a further object being to operate the system primarily in accordance with the gross response of the detector, means being provided for modifying or modulating such control of the system in accordance with the rate of change of detector response; yet another object of the invention being to operate the controlled relay by means of electrical power including components released under the control of electron flow valves respectively operated in accordance with the gross response of the detector and the rate of change of detector response.

The foregoing and numerous other important objects and inherent functions of the invention will become apparent as the same is more fully understood from the following description which, taken in conjunction with the accompanying drawings, discloses a preferred embodiment of the invention.

Referring to the drawings.

Figure 1:
Figs. 1 and 2 are diagrammatic showings illustrating the head-on approach of headlighted vehicles.
Figure 2:
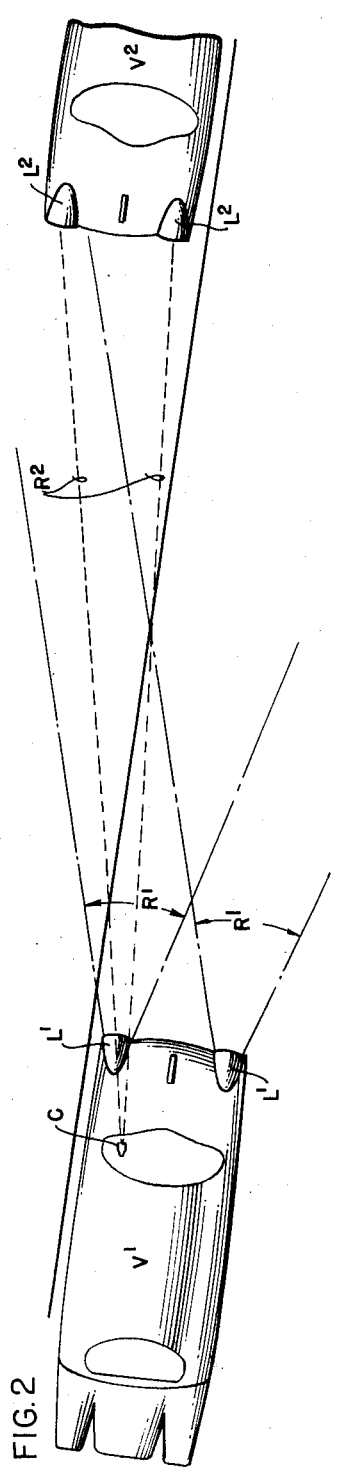

To illustrate the invention the drawings show a vehicle V' carrying a pair of vehicle headlamps L' for projecting beams of light R' outwardly of a vehicle V' in which the lamps are mounted. Each of the lamps L' may embody a high or bright beam filament 12 and a low or dim beam filament 13, one end of each of said filaments being electrically connected to the preferably grounded side of a suitable electrical power source 14. The ground remote ends of the high beam filaments may be electrically interconnected with one contact 15H of a single pole, double throw, manually operable dimmer switch 15. The ground remote ends of the low beam filaments may also be interconnected with another contact 15L of said dimmer switch, the pole of the dimmer switch being electrically connected with the ground remote side of the power source 14, as through suitable switch means including a control switch 16 and other circuit devices, such as a meter 17, if desired.

The power source 14 may conveniently comprise a conventional storage battery of the sort commonly provided as standard equipment in automotive vehicles for the operation of the headlights and other electrical equipment. When the pole of the switch 15 is connected with the power source 14, as through the control switch 16, the high and low beam filaments 12 and 13 may be alternately energized at will by operating the dimmer switch 15 which may conveniently be mounted upon the floor of the vehicle V' in position to be actuated by the foot of the vehicle operator. The light rays R' emitted by the lamps L' of the vehicle V' may thus be dimmed by action of the vehicle operator, in response to the head-on approach of another headlighted vehicle V², and the rays R' may be restored at will to bright condition by the operator of the vehicle V', as after the passage of the vehicle V² behind the vehicle V'.

In order to provide for the automatic control of the headlights L' in response to the head-on approach of another headlighted vehicle, such as the vehicle V², a single pole, double throw, automatically operable relay switch 18, having a pair of stationary contacts 18L and 18H, may be employed, said relay switch having an operating coil 18C and a pole normally biased, as by means of a spring, to yieldingly engage with the contact 18H. By energizing the coil 18C, the pole of the relay switch may be moved out of engagement with the contact 18H and into engagement with the contact 18L. The contact 18H and 18L are adapted to be electrically connected respectively with the corresponding contacts 15H and 15L of the manually operable dimming switch, that is to say, the contacts 18H and 18L are electrically connected respectively with the ground remote ends of the high and low beam filaments 12 and 13. Selector means, such as the single pole, double throw switch 19, may be provided for electrically connecting the poles of the switches 15 and 18 selectively with the power source 14, as through the switch 16 and meter 17.

The manually operable dimmer switch 15 may, of course, be omitted entirely, in which case the selector switch 19 may also be omitted and the pole of the relay switch 18 connected directly to the switch 16; but where both manually operable and automatic switches 15 and 18 are included in the same system, it may be desirable to provide the selector switch 19 or other suitable means operable so that headlight energizing power may be supplied from the source 14 either through the manually operable switch 15 or through the automatically operated relay switch 18.

In order to selectively operate the switch means 18 for the automatic control of the headlights L', in response to the head-on approach of the other headlighted vehicle V², the present invention contemplates a light responsive, electrically actuated translation system 20 adapted to energize the relay coil 18C when the intensity of headlight beams R², which reach the vehicle V' from the headlamps L² of the approaching vehicle V², attains a selected lamp dimming level. To this end, the system 20 comprises a light sensitive detector 21 mounted in position to receive the impingement of light rays R² emitted by the headlights of the approaching vehicle, said detector 21 preferably comprising a crystalline semi-conductor material of the electron donor type, that is to say, a crystalline semi-conductor selected from the class comprising cadmium sulphide, mercury sulphide, and cadmium selenide. These crystalline semi-conductors exhibit the power of altering the impedance of the crystal in manner corresponding with the intensity of light rays impinging thereon. The detector 21, accordingly, may be made to control the system to energize the coil 18C when the impedance of the detector reaches a predetermined value in response to increasing intensity of the headlight beams R² of the approaching vehicle.

The light sensitive crystal detector 21 is preferably sealed within a translucent preferably glass envelope E, which may either be evacuated or else charged with a preferably inert gas, such as nitrogen. The envelope E may comprise a cylindrical member formed with an integral, preferably hemi-spherical closure wall at one end.

The crystal detector 21 may be electrically connected on and between the ends of a pair of spaced apart, electrically conducting support stems S mounted substantially parallel within the cylindrical member in position supporting the detector 21 substantially at and within the hemi-spherical end closure wall of the envelope E. The stems S preferably comprise metal members capable of being sealed to glass, and said stems, remote from the detector 21, may form glass-to-metal seals with a stem supporting end closure wall sealing said envelope at the end thereof remote from said hemi-spherical closure wall. The detector mounting stems may extend through and outwardly of said stem supporting end closure wall for connection with the translation system 20. If desired, the stem supporting end closure wall may also be formed with sealable duct means D through which the envelope may be evacuated and charged with inert gas.

The detector enclosing envelope may be mounted in position presenting the detector crystal 21 at the focus of a light collecting reflector device C, which may conveniently comprise a parabolic shell formed with internal light reflecting mirror surfaces adapted to deliver, at the focus of the device, all light rays entering the open end of the shell. The shell, at its apexial portion, opposite the open end thereof, may be fitted with a mounting sleeve M sized to snugly yet slidingly receive the cylindrical envelope E; and said envelope may be secured and anchored in the sleeve, in position presenting the crystal 21 at the focus of the light collecting device, as by means of any suitable preferably quick drying cement, such as malachite basic cement.

The change in detector impedance, in response to changing intensity of impinging light rays, however, while prompt is not instantaneous. Each detector material exhibits its own characteristic impedance change lag in response to variation of impinging light intensity. The lag interval may be of the order of a few seconds. Since the approach time of vehicles, from the instant of initial visibility to the instant of passing, is substantially in excess of the detector lag interval, the system may be made to operate by measuring the gross response of the detector to the progressively increasing intensity of the ray beams R² emitted by the headlamps of the approaching vehicle and by actuating the relay 18 when the measured response of the detector reaches a predetermined value. This is because the response of the detector, while relatively slow, is nevertheless faster than the rate at which the intensity of the beams R² changes as the result of the mutual approach of the vehicles V' and V².

The detector not only lags in response to increasing intensity of impinging rays, but also in response to impinging light of decreasing intensity. During the lag interval, whether in response to increasing or decreasing intensity of impinging light, the impedance of the detector initially changes with maximum rapidity and finally more slowly as the steady value is approached. This characteristic may be utilized to advantage and in novel fashion in providing for the operation of the system 20, and especially to accomplish the substantially instantaneous restoration of the lamps L' to high or bright beam condition, as soon as the ray beams R² cease to impinge upon the detector 21, at the instant of vehicle passing, despite the lagging character of the detector response to the removal of impingement of the beams R² on the detector 21.

To operate the system 20 in accordance with the present invention, power from the power source 14 may be applied through a vibrator device 22 to the primary winding 23 of a transformer 24, said primary winding 23 having a center tap connected preferably with the high or ground remote side of the power source 14, the opposite ends of the winding 23 being respectively connected with the stationary contacts of the vibrator device, the pole of the vibrator device being connected with the grounded side of the power source.

The transformer 24 embodies a secondary winding 25, having a grounded center tap and opposite ends connected with a full wave rectifier 26 adapted to apply unidirectional potential, preferably of the order of 250 volts with respect to ground, upon a bus conductor 27. A condenser 25' may be connected across the secondary transformer winding 25, if desired. The detector element 21 may be connected with the conductor 27 and grounded through a resistor 28. Accordingly, the detector will pass uni-directional current to ground through the resistor 28, whereby a potential will be developed across the resistor 28 at all times corresponding precisely with the impedance of the detector element. The voltage thus developed across the resistor 28 will correspond with the intensity of light impingement upon the detector 21.

The system 20 also comprises a pair of electron flow tubes 29 and 29', each having an anode, a cathode and a control grid, the anodes of said tubes being electrically interconnected with one side of the relay coil 18C, the other side of said coil being connected to the conductor 27. The cathode of the tube 29 may be interconnected with the control grid of the tube 29' through a condenser 30, the grid of the tube 29' being also connected to ground through a resistor 31. The cathode connected side of the condenser 30 also may be connected through a resistor 32 with the adjustable member of a potentiometer 33 connected in turn between ground and the bus conductor 27 in series with a resistor 34. The condenser 30 and the resistor 31 serve to control the tube 29' in accordance with the rate of change of the response of the detector 21 to variations in intensity of detector impinging light rays. The bus conductor also is preferably connected to ground through a condenser 35. The cathode of the tube 29' may be connected to ground through a circuit comprising a condenser 36 and a resistor 37 connected in parallel.

The control grid of the tube 29 is isolated from ground by means of a condenser 38, said grid being connected with the ground remote side of the resistor 28, through a resistor 39, so that the voltage developed across said resistor in proportion to impedance measuring flow of current in the detector 21 may be applied through the resistor 39 upon the control grid of the tube 29.

The cathodes of the tubes 29 and 29' and of the rectifier 26, of course, may be excited by filaments energized from the power source 14. The tube 29 is thus controlled directly in response to the value of crystal current, since the control grid of said tube is connected through resistor 39 to receive voltage corresponding with that developed across the resistor 28 as the result of and proportional to current flow through the crystal detector. The other tube 29', however, is controlled in accordance with the rate of change of current flowing in the crystal detector, that is to say, in manner corresponding to the rate of change of detector impedance. For such purpose, the condenser 30 and resistor 31, which are connected with the control grid of the valve 29', form a rate of current change circuit controlling the operation of the tube.

Figure 4:
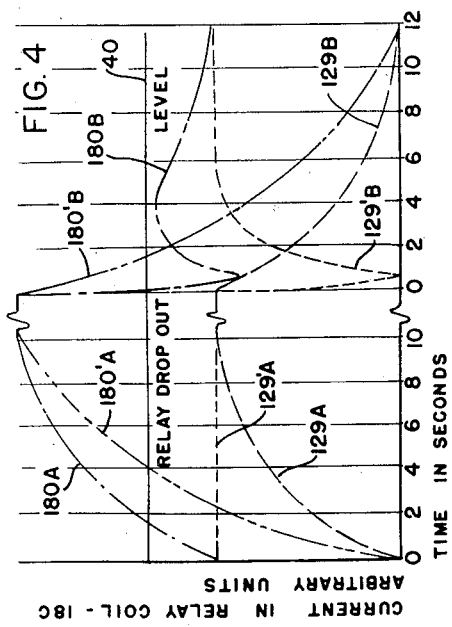
Figure 3:
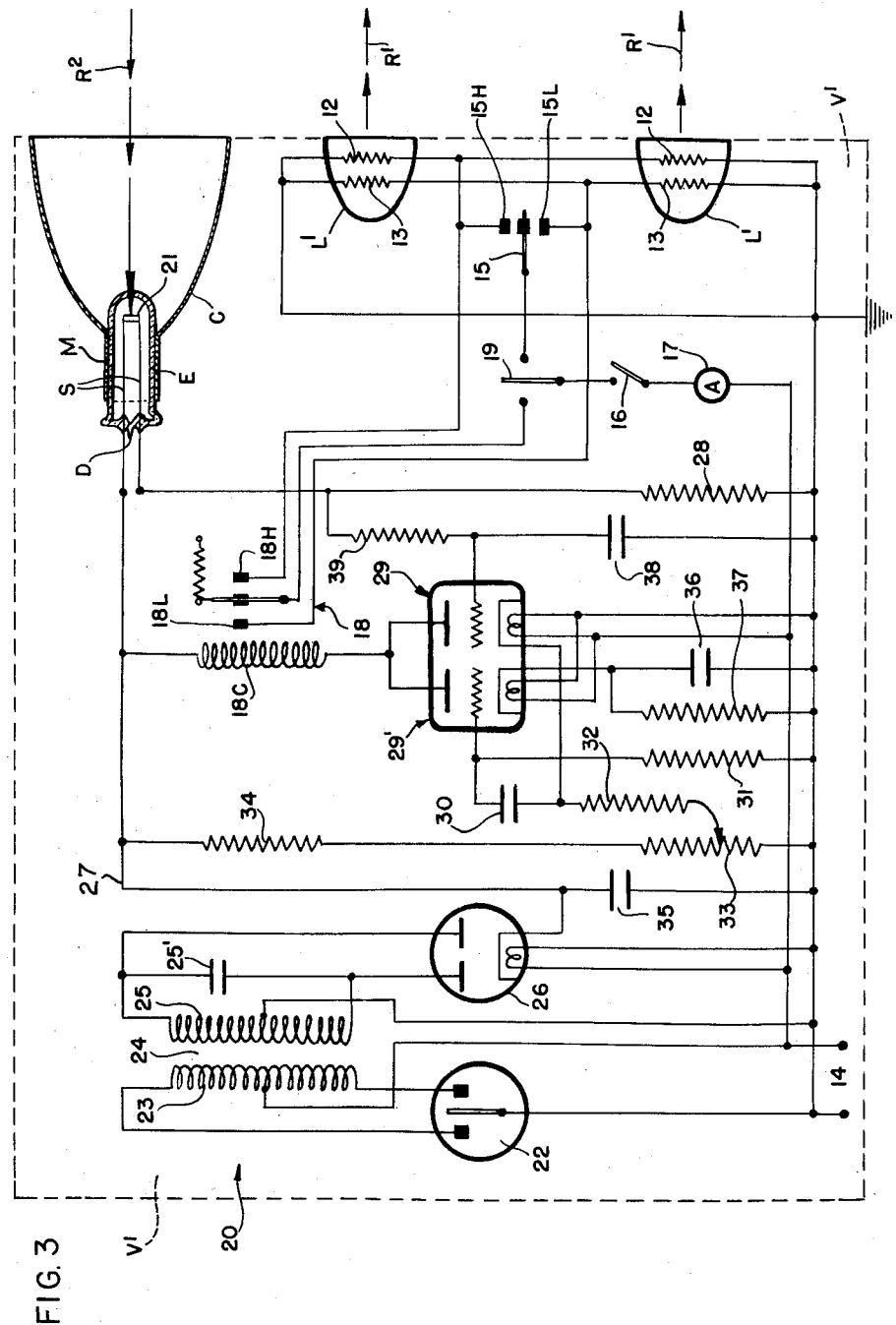
Fig. 3 is a diagrammatic representation of a light responsive control system embodying the present invention.

As shown in Fig. 4, the current which is delivered through the tube 29 is illustrated by the lines 129A and 129B. The line 129A shows the current which flows in progressively increasing fashion as the result of the application of light upon a previously unilluminated detector. The line 129B illustrates the progressive decline of current flow which occurs upon the discontinuation of detector illumination. Current flow in the tube 29' is shown by the lines 129'A and 129'B. The current is normally held at a value determined by the resistor 37, as shown by the line 129'A, but is pulsively diminished, as hereinafter more fully explained, whenever illumination of the detector 21 is suddenly discontinued. The lines 180A and 180B show the resultant current delivered through the relay coil 18C by the combined action of the tubes 29 and 29'.

When the intensity of the beam $R^2$ is below a predetermined value, the sum of the currents in the tubes 29 and 29' will be less than that required to actuate or pull in the relay 18 for headlight dimming purposes. Accordingly, the bright filaments 12 of the headlamps will normally be operated as the result of maintenance of the bright light filament energizing circuit including the switch contact 18H. When the light beam $R^2$ of an approaching vehicle $V^2$ impinges upon the crystal detector 21, the current flowing between the anode and cathode of the tube 29 is caused to increase as a proportional function of the intensity of the beam. As the headlights $L^2$ of the approaching vehicle apply, upon the detector 21, exciting ray beams $R^2$ of progressively increasing intensity, the current caused to flow through the detector element 21 will likewise increase, thereby causing a corresponding increase in the current flow between anode and cathode of the tube 29. The relay coil 18C, accordingly, may be made to actuate the switch 18 to dim the headlamps when the intensity of the impinging beam $R^2$ exceeds a predetermined value at which the current flow in the valve 29, when added to that in the tube 29', exceeds the current required to operate the relay. The relay coil thus actuates the switch 18 at a light intensity level determined by the adjustment of the potentiometer 33.

Figure 5:
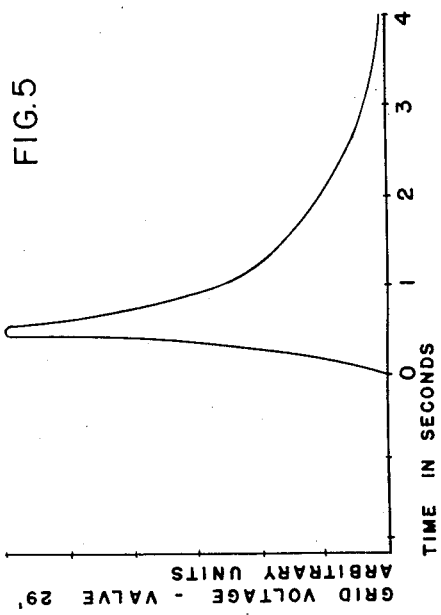
Figs. 4 and 5 are graphs illustrating the performance of the system.

After the headlights have thus been dimmed by operation of the relay 18, the same will remain in dimmed condition so long as the ray beams $R^2$ continue to impinge upon the detector 21. As soon, however, as the intensity of the light beam $R^2$ upon the detector crystal 21 is reduced below a critical relay release level, as when the system actuating vehicle $V^2$ passes behind the system carrying vehicle V', the circuit comprising the condenser 30 and resistor 31 immediately becomes effective to cause a large voltage pulse to be applied to the control grid of the tube 29'. This voltage pulse is illustrated graphically in Fig. 5, and is a function of the rate of change of crystal current, which initially diminishes very rapidly in response to reduction of intensity of light impinging on the detector 21. The application of this heavy voltage pulse upon the grid of the tube 29' instantaneously blocks all current flow between its anode and cathode for a short time interval immediately following the reduction in intensity of the light beam $R^2$, as illustrated by the line 129'B in Fig. 4.

Coupled with the decrease of current flow between the anode and cathode of the tube 29 as the result of reduction in the intensity of the beam $R^2$, the instantaneous blockage of current in the tube 29', as the result of the voltage pulse applied to its grid, allows the relay switch 18 to operate, under the influence of its biasing spring, within a very short, substantially instantaneous interval, as indicated by the intersection of the line 180B with the relay drop-out level line 40, in Fig. 4. This would not be the case in the event that the relay coil 18C were operated solely in response to current flow in the detecting crystal 21, in which case the detector controlled current supplied for the operation of the relay would be substantially as shown by the graph lines 180'A and 180'B, in Fig. 4.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Control apparatus comprising an electrical power operable device, a photosensitive detector having initially rapid and thereafter progressively slower time lagging impedance response characteristics when exposed to light of changing intensity, means to develop electrical power having an intensity level varying as a function of the rate of change of the impedance of said detector, and means for applying such developed power to said device for the actuation of the same.

2. Control apparatus comprising an electrical power operable device, a photosensitive detector having initially rapid and thereafter progressively slower time lagging impedance response characteristics when exposed to light of changing intensity, means to develop electrical energy having fluctuating characteristics corresponding with the changing impedance of the detector, means for producing electrical power having an intensity level varying as a function of the rate of change of said fluctuating characteristics, and means for applying such power for the actuation of said device.

3. Control apparatus comprising an electrical power operable device, a photosensitive detector having initially rapid and thereafter progressively slower time lagging impedance response characteristics when exposed to light of changing intensity, an electron tube for controlling the delivery of electrical power for the operation of said device, means for developing electrical tube controlling energy varying as a function of the rate of change of the impedance of said detector and for applying said energy for the control of said tube.

4. Control apparatus comprising an electrical power operable device, a photosensitive detector having initially rapid and thereafter progressively slower time lagging impedance response characteristics when exposed to light of changing intensity, an electrical circuit connected with the detector for developing electrical energy conditions in said circuit corresponding with the impedance of the detector, timing means connected with said circuit for producing electrical energy having intensity corresponding with the rate of change of the impedance of said detector, and means for actuating said device in response to the so produced energy.

5. Control apparatus comprising an electrical power operable device, a photosensitive detector having initially rapid and thereafter progressively slower time lagging impedance response characteristics when exposed to light of changing intensity, an electron tube for controlling the delivery of electrical power for the operation of said device, an electrical circuit connected with the detector for developing electrical conditions in said circuit corresponding with the impedance of the detector, timing means comprising a resistor and condenser network connected with said circuit for producing energy having intensity corresponding with the rate of change of said electrical conditions, and means for applying said energy for controlling the operation of said tube.

6. Control apparatus for dimming the headlights of a vehicle comprising an electrical power operable relay switch normally biased to energize the vehicle headlights for bright operation, control means to operate said relay switch at intervals to energize the headlights for dim operation, said control means comprising a light sensitive detector mounted in position in the vehicle to receive the impingement of light rays emitted by an approaching vehicle, means to continuously develop a fluctuating potential voltage proportional to the varying impedance of the detector, means to produce a potential fluctuating in accordance with the rate of change of said voltage, a pair of electron flow amplifiers connected in parallel relationship for the operation of the relay switch, said amplifiers each having a control grid, and means to apply said potential voltage proportional to the varying impedance of the detector as well as the potential fluctuating in accordance with the rate of change of said voltage upon the control grids of said amplifiers whereby to cause delivery of electrical switch operating energy in quantities corresponding with the impedance of the detector and the rate of change of said impedance.

7. Control apparatus for dimming the headlights of a vehicle comprising an electrical power operable relay switch normally biased to energize the vehicle headlights for bright operation, control means to operate said relay switch at intervals to energize the headlights for dim operation, said control means comprising a light sensitive detector mounted in position in the vehicle to receive the impingement of light rays emitted by an approaching vehicle, an impedance controlled circuit including a resistor connected in series with the detector, means to apply uni-directional potential in said circuit to continuously develop electrical energy values in said circuit proportional to the impedance of the detector, means comprising a resistor-condenser timing circuit interconnected with said circuit to develop a potential in said timing circuit proportional to the rate of change of said electrical energy, and a pair of electron flow amplifiers connected in parallel relationship for the operation of the relay switch, said amplifiers each having a control grid, said grids being respectively connected with said impedance controlled and timing circuits, whereby said amplifiers are caused to deliver electrical switch operating energy respectively in quantities corresponding with the impedance of the detector and with the rate of change of said impedance.

References Cited in the file of this patent

UNITED STATES PATENTS

| | | |
|---|---|---|
| 2,582,850 | Rose | Jan. 15, 1952 |
| 2,614,227 | Bordewieck | Oct. 14, 1952 |
| 2,706,791 | Jacobs | Apr. 19, 1955 |
| 2,706,792 | Jacobs | Apr. 19, 1955 |
| 2,759,124 | Willis | Aug. 14, 1956 |
| 2,760,114 | Falge et al. | Aug. 21, 1956 |

OTHER REFERENCES

Huxford: "A Photoelectric Method for Tracing Current Waveforms" Review of Sci. Insts., vol. 8, 1937, Q184.R5, pp. 285–390.